United States Patent [19]

Kajita

[11] Patent Number: 4,707,774

[45] Date of Patent: Nov. 17, 1987

[54] FLYWHEEL POWER SOURCE APPARATUS

[75] Inventor: Takeyoshi Kajita, Aichi, Japan

[73] Assignee: Mitsubishi Denki Kabushiki Kaisha, Japan

[21] Appl. No.: 924,871

[22] Filed: Oct. 30, 1986

[30] Foreign Application Priority Data

Oct. 31, 1985 [JP] Japan ................................ 60-244593

[51] Int. Cl.<sup>4</sup> ............................................ H02M 5/451
[52] U.S. Cl. ..................................... 363/37; 363/124; 307/66
[58] Field of Search .................... 363/124, 37; 307/66, 307/67, 46

[56] References Cited

U.S. PATENT DOCUMENTS 4,065,711 12/1977 Kawabata ........................ 307/66 X

FOREIGN PATENT DOCUMENTS 32570 2/1985 Japan ................................... 363/124
60-66632 4/1985 Japan .
60-197198 10/1985 Japan .
2137833 10/1984 United Kingdom ................. 307/66

Primary Examiner—Patrick R. Salce
Assistant Examiner—Kristine Peckman
Attorney, Agent, or Firm—Bernard, Rothwell & Brown

[57] ABSTRACT

A flywheel power source apparatus of the invention can be additively used in a power source apparatus for a load such as computer, which is adversely affected by momentary service interruption or large voltage variation. The flywheel power source apparatus comprises a main circuit having a converter for converting AC power source output into DC output and a first inverter for converting the DC output of the converter into AC output and supplying it to a load, a flywheel device supplied with power from the main circuit and driven for rotation, and a compensation circuit for supplying the stored energy based on the rotational energy of the flywheel device to the first inverter of the main circuit. The flywheel power source apparatus is composed of a chopper circuit for controlling the voltage of the compensation circuit, a second inverter circuit for controlling the frequency of the compensation circuit, and first and second comparators for comparing outputs during outage of the power source and in a normal state with reference values respectively and controlling the chopper circuit.

6 Claims, 5 Drawing Figures

FLYWHEEL POWER SOURCE APPARATUS

BACKGROUND OF THE INVENTION

1. Field of the Invention

The present invention relates to flywheel power source apparatuses, and more particularly to a flywheel power source apparatus which is effective as a power source for computers or the like, wherein continuous supply of power to a load is required during outage of a power source and even when large voltage variation occurs at the power source the voltage variation supplied to the load must be minimized.

2. Description of the Prior Art

As a result of the significant development of computer technology in recent years, computers have been introduced in the industrial field and other fields. In such a computer, if power supply to the main components, particularly a processing unit, a memory unit or the like, is interrupted due to outage or large voltage variation, the processing until then may become useless or the stored information may be lost.

Consequently, in the prior art, a flywheel power source apparatus as shown in FIG. 1 or FIG. 2 is used as a power supply compensation means during service interruption or large voltage drop. The flywheel power source apparatus in FIG. 1 and FIG. 2 is disclosed in Japanese Laid-open Applications No. 60-66632 and No. 60-197198, respectively. The flywheel power source apparatuses utilize rotational force of a flywheel rotating at a high speed, and convert the rotational energy into electric energy and supply it to a computer or the like.

FIG. 1 shows an example of a flywheel power source apparatus in the prior art. In FIG. 1, F designates a power source apparatus body. The power source apparatus body F comprises an auxiliary inverter 1, a converter 2, a changeover switch 3, a main circuit converter 4, a main circuit inverter 5, and a switching circuit 67 having a changeover switch 6 of main circuit S and a changeover switch 7 of direct voltage delivery circuit L. Numeral 8 designates an AC (alternating current) power source, numeral 9 a load, and R a flywheel device. The flywheel device R is composed of a generator/motor unit and a flywheel. The flywheel device R normally rotates the flywheel by output of the auxiliary inverter at 30,000 r.p.m. for example, and during service interruption the device converts the rotational energy of the flywheel into electric energy and outputs it.

Operation of the flywheel power source apparatus will now be described. The main circuit S composed of the main circuit converter 4 and the main circuit inverter 5 supplies AC power of constant voltage and constant frequency from the external power source 8 to the load 9 through the changeover switch 6. Then the changeover switch 3 for a compensation circuit P composed of the auxiliary inverter 1, the flywheel device R and the converter 2 is open, and the flywheel contained in the flywheel device R stores energy according to the high speed rotation by the auxiliary inverter 1.

If an abnormal state occurs in the external power source 8 due to outage or the like, the changeover switch 3 controlled by an outage detecting means (not shown) is closed, and power generation is effected in the generator by the inertial energy of the flywheel of the flywheel device R. The AC power is converted into DC power by the converter 2, and the DC power is supplied through the inverter 5 and the changeover switch 6 to the load 9.

When the changeover switch 7 is turned on, the changeover switch 6 is turned off.

In the above constitution, however, since the converter 2 and the switch 3 are required at the output side of the flywheel device, the circuit constitution is complicated and the cost becomes high.

In order to solve the above-mentioned problems, the applicant has already proposed a flywheel power source apparatus, wherein an auxiliary inverter is connected between an input/output terminal of a flywheel device and the front side of an inverter to constitute the main circuit.

FIG. 2 is a block diagram of the flywheel power source apparatus, and parts corresponding to those in FIG. 1 are designated by the same reference numerals.

In FIG. 2, numeral 10 designates a transformer, and a primary winding 10a of the transformer 10 is connected through a switch 11 to AC power source 8. A secondary winding 10b of the transformer is connected to a series circuit comprising a converter 4 of main circuit S, a chopper circuit 12, a DC (direct current) filter 13, a main circuit inverter 5 and a switching circuit 67.

The secondary winding 10b is connected to direct voltage delivery circuit L. Numeral 14 designates an auxiliary inverter, and the input stage of the auxiliary inverter 14 is connected to the joint between the converter 4 of the main circuit S and the chopper circuit 12, and the output stage thereof is connected to the input/output terminal of a flywheel device R. The auxiliary inverter 14 and the flywheel device R constitute the voltage compensation circuit P.

Numeral 15 designates a switch connected between the switching circuit 67 and the load 9.

Operation of the flywheel power source apparatus will be described. At normal state, output of the AC power source 8 is supplied to the primary winding 10a of the transformer 10 through the switch 11. Output obtained from the secondary winding 10b of the transformer 10 is converted into DC voltage by the converter 4 and further converted into constant voltage by the chopper circuit 12, and then the ripple of the DC output is removed by the DC filter 13. The DC output from the DC filter 13 is supplied to the inverter 5 and converted into AC by the inverter 5, and the AC output is shaped into a sinusoidal wave by an AC filter (not shown) and then supplied through the switching circuit 67 and the switch 15 to the load 9.

On the other hand, the DC output from the converter 4 is converted into high frequency by the inverter 14, thereby the flywheel device R is rotated at a high speed and stores energy.

If an abnormal state such as outage or voltage reduction of the power source 8 occurs, output of the converter 4 is reduced. Then the rotational energy stored by rotation of the flywheel device R is released as electric energy, and the output voltage accompanying the release is supplied to the auxiliary inverter 14. The AC voltage supplied to the auxiliary inverter 14 is converted into DC and supplied through the auxiliary inverter 14 to front stage of the chopper circuit 12 of the main circuit S.

Output supplied from the flywheel device R to the front stage of the chopper circuit 12 is supplied through the DC filter 13, the inverter 5, the switching circuit 67 and the switch 15 to the load 9.

In the above-mentioned flywheel power source apparatus in the prior art, however, since the auxiliary inverter 14 only is installed between the main circuit S and the flywheel device R, one auxiliary inverter must control voltage and frequency simultaneously and therefore the power control by the inverter is complicated.

Since the chopper circuit 12 installed in the main circuit S is normally operated, it must be designed with continuous rating.

Further, since ripple in significant amount is produced in the output of the chopper circuit 12, the DC filter 13 must be installed at the output stage of the chopper circuit 12 as above described; thereby the constitution is complicated and the cost becomes high.

SUMMARY OF THE INVENTION

A first object of the invention is to provide a flywheel power source apparatus wherein a chopper circuit is installed at the main circuit side of a voltage compensation circuit including a flywheel device so that the inverter control can be easily performed.

A second object of the invention is to provide a flywheel power source apparatus wherein even if a chopper circuit is not installed at the main circuit side the power supply to the load side is stabilized. Thereby the rating burden of the main circuit can be reduced.

A third object of the invention is to provide a flywheel power source apparatus wherein not only a chopper circuit at the main circuit side but also a DC filter may be obviated. Thereby the whole constitution becomes simple and the cost becomes low.

In order to attain the foregoing and other objects, in a flywheel power source apparatus of the invention, a chopper circuit for controlling voltage and an inverter circuit for controlling frequency are connected in series between the front stage of an inverter of the main circuit and a flywheel device, and the chopper circuit is controlled based on the result of comparison of the speed reference value of the flywheel device and the speed detection value of the flywheel device and also controlled based on the result of comparison of the voltage reference value of DC output of the main circuit converter and the voltage output value of the chopper circuit.

DETAILED DESCRIPTION OF THE PREFERRED EMBODIMENTS

Preferred embodiments of a flywheel power source apparatus according to the invention will now be described in detail referring to the accompanying drawings.

Figure 1:
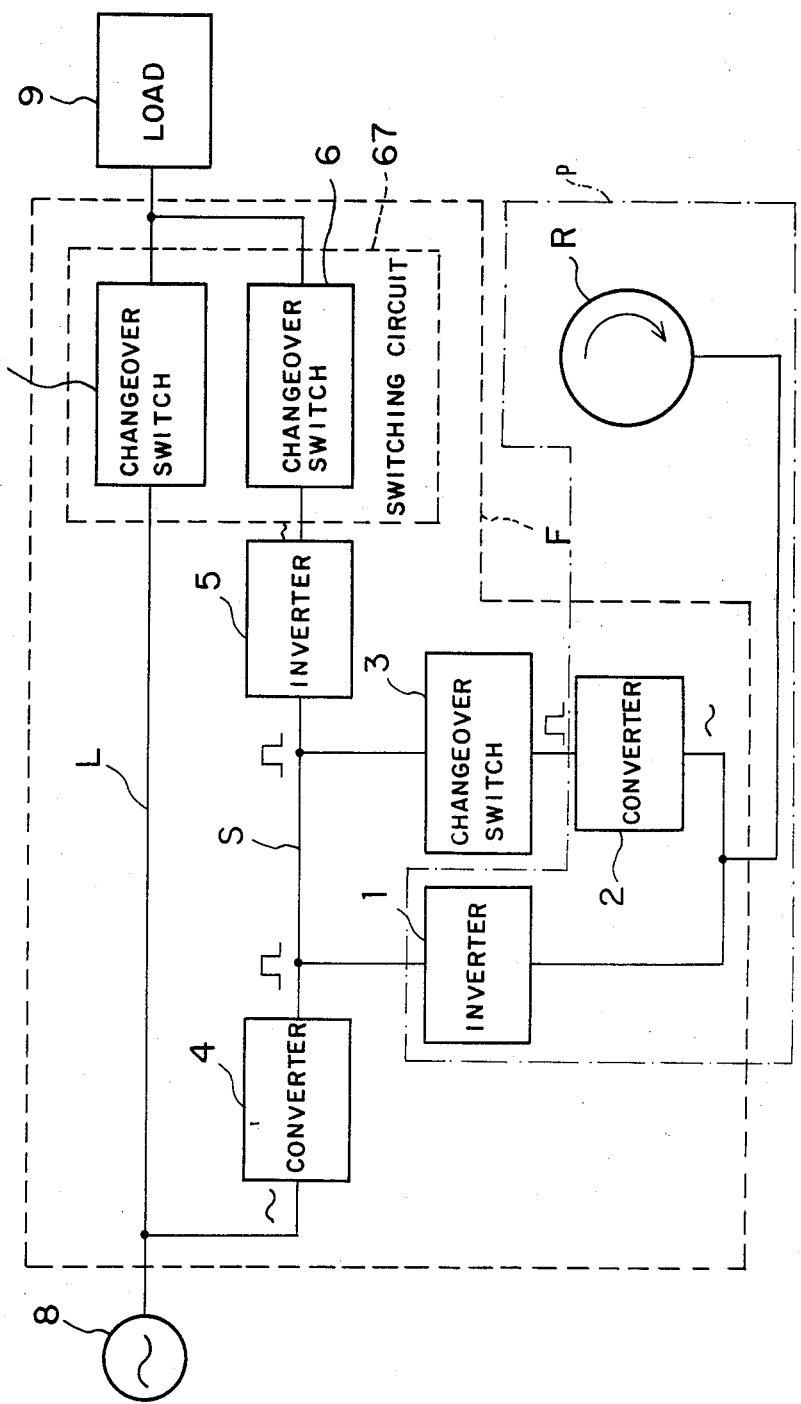
FIG. 1 is a block constitution diagram of an example of a flywheel power source apparatus in the prior art.
Figure 2:
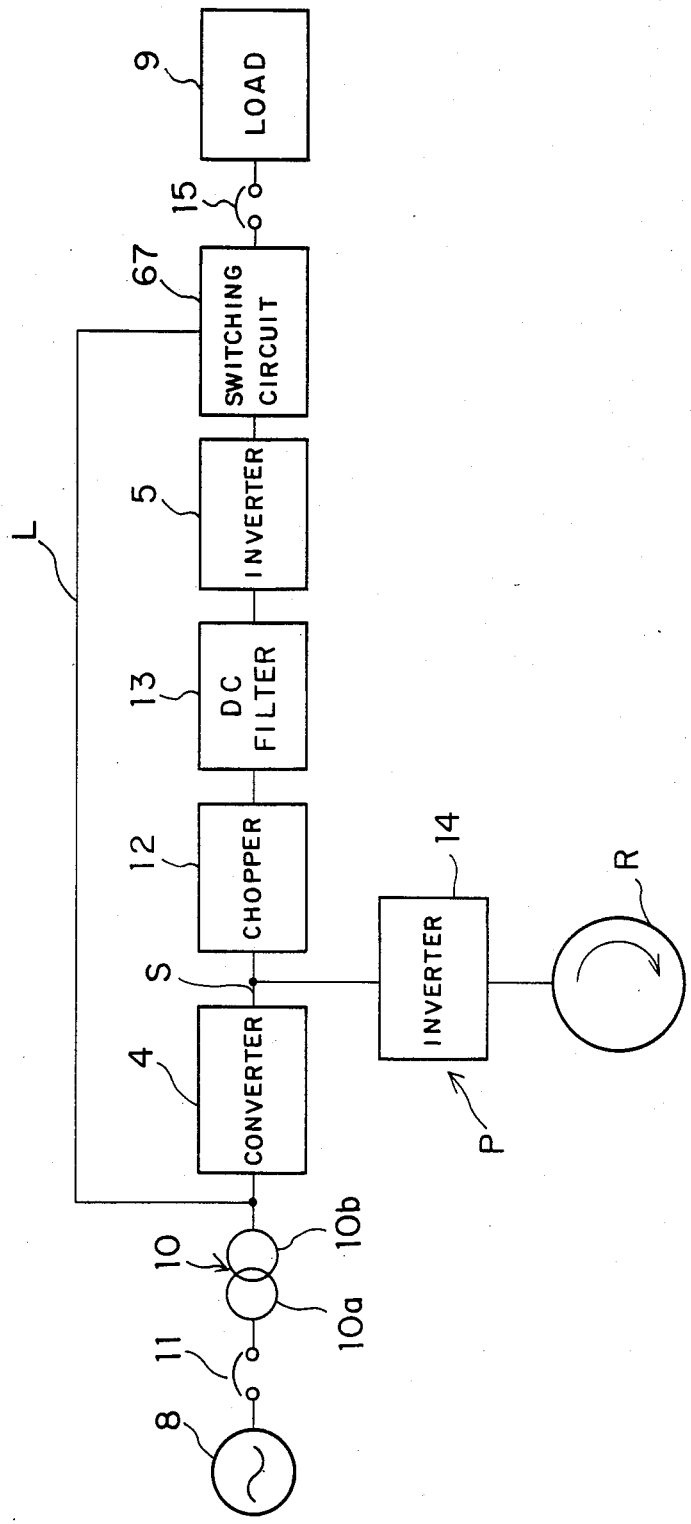
FIG. 2 is a block constitution diagram of another example of a flywheel power source apparatus in the prior art.
Figure 3:
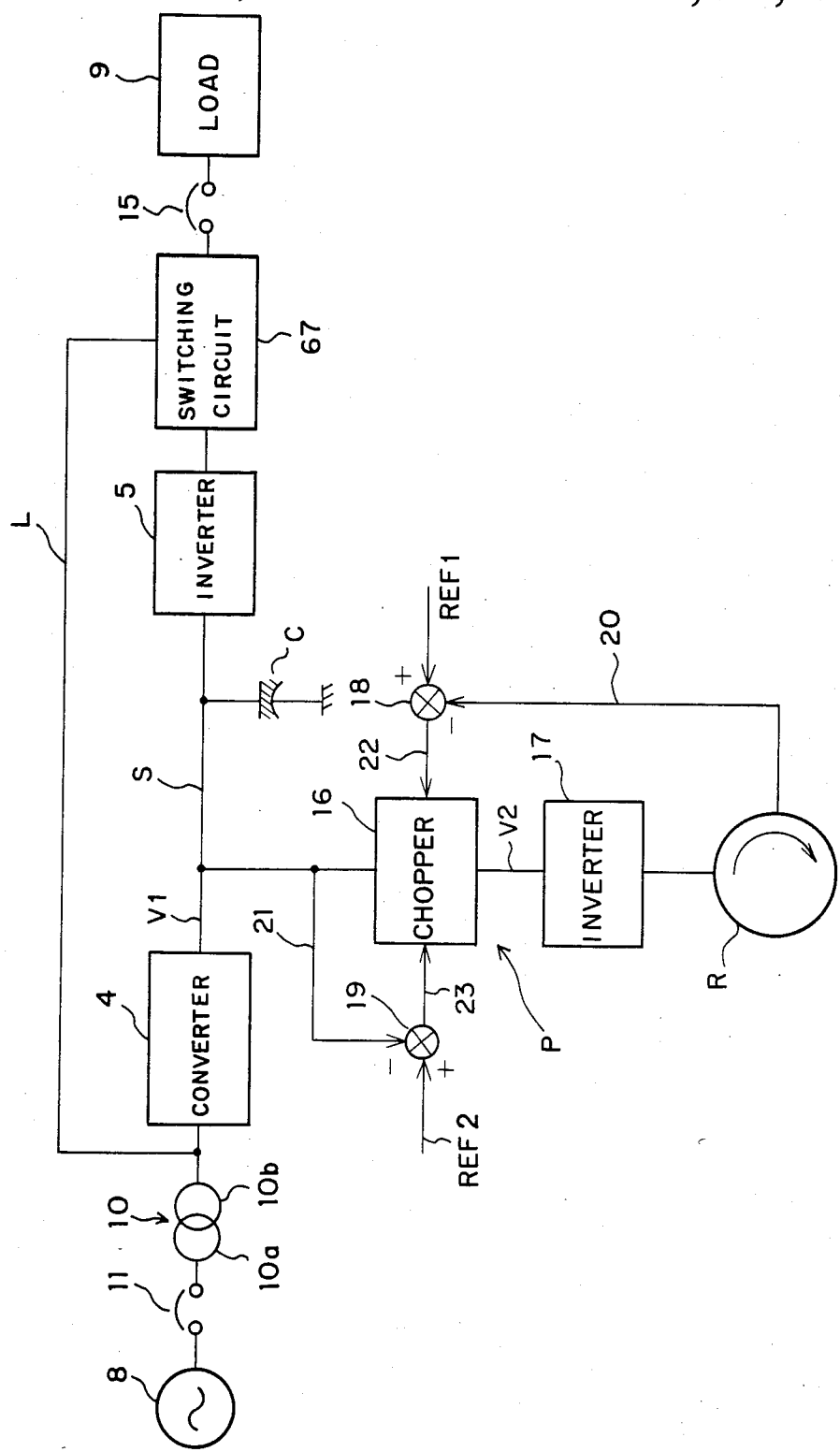
FIG. 3 is a block constitution diagram of a flywheel power source apparatus as an embodiment of the invention.

FIG. 3 is a block constitution diagram illustrating an embodiment of the invention, and parts in FIG. 3 corresponding to those in FIGS. 1 and 2 are designated by the same reference numerals and the overlapping description is omitted.

A capacitor C is connected in parallel at the front stage of an inverter 5 installed in main circuit S in FIG. 3. A voltage compensation circuit P and a flywheel device R in series connection to each other are connected in parallel at the joint between the capacitor C and a converter 4. The voltage compensation circuit P is composed of a chopper 16 at one side of the main circuit S and an inverter 17 connected in series. The chopper 16 is controlled according to comparison results 22, 23 of a first comparator 18 comparing reference value REF 1 with speed detection value 20 of the flywheel device R and a second comparator 29 comparing reference value REF 2 of DC output voltage of the converter 4 of the main circuit S with voltage output value 21 of the chopper 16, respectively.

Figure 4:
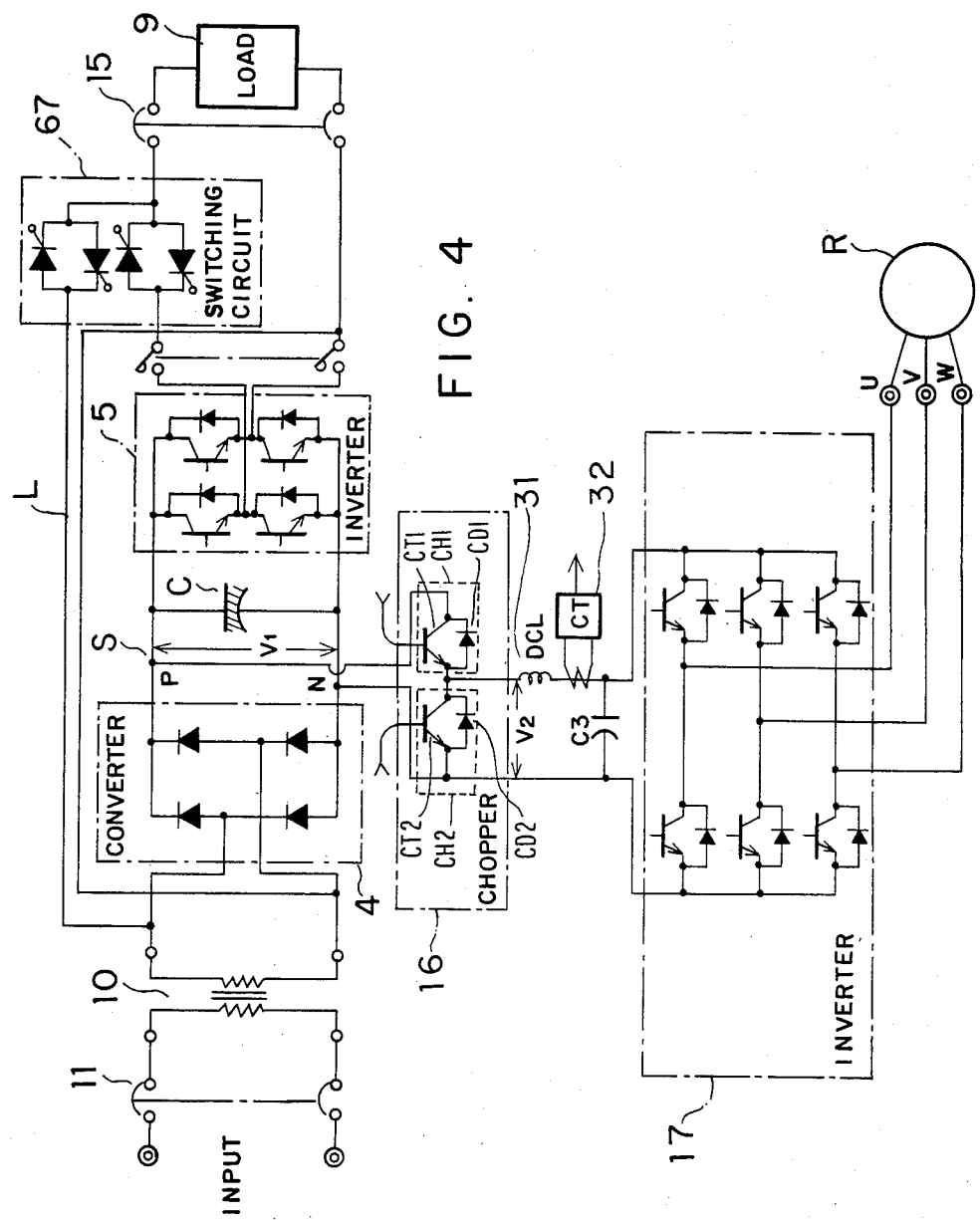
FIG. 4 is a detailed circuit diagram of a flywheel power source apparatus shown in FIG. 3.
Figure 5:
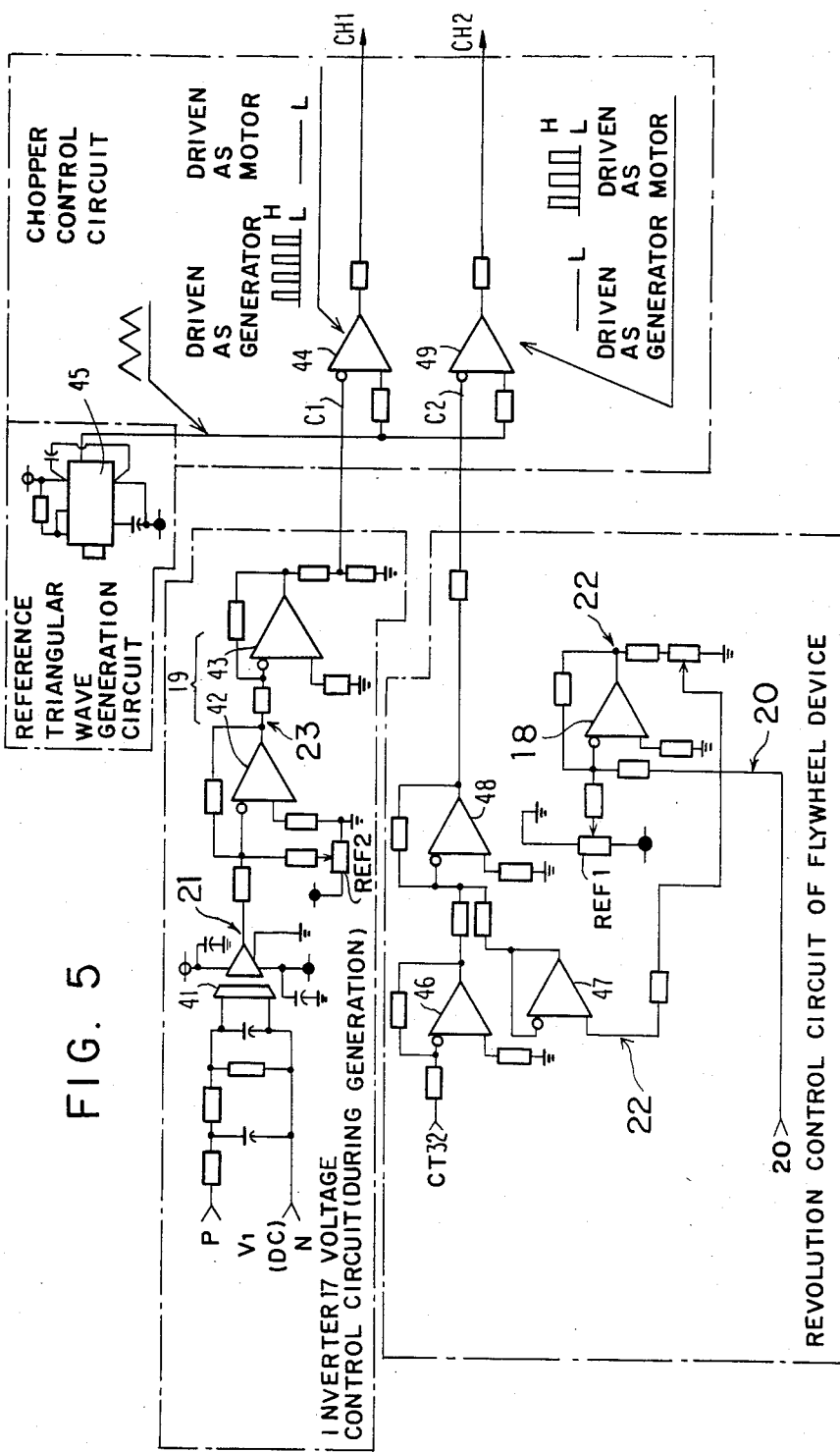
FIG. 5 is a detailed circuit diagram of a voltage compensation circuit P shown in FIG. 4.

FIG. 4 and FIG. 5 are detailed circuit diagrams of a flywheel power source apparatus shown in FIG. 3, and parts corresponding to those in FIG. 3 are designated by the same reference numerals. In FIG. 4, a reactor 31 and a current transformer 32 are arranged between the chopper 16 and the inverter 17. A first chopper circuit CH1 is composed of a transistor CT1 and a diode CD1. The first chopper circuit CH1 and the reactor 31 function as a boosting chopper. In the meantime, a second chopper circuit CH2 consists of a transistor of CT2 and a diode CD2. The second chopper circuit CH2 and the reactor 31 function as a falling chopper.

In FIG. 5, an inverter voltage control circuit controls the boosting chopper composed of the first chopper circuit CH1 and the reactor 31. An amplifier 41 detects the voltage P and N of the DC main circuit S. The second comparator 19 consists of inverting operation amplifiers 42 and 43. The inverting amplifier 42 compares voltage output value 21 with reference voltage value REF 2, and outputs comparison result 23 to the inverting amplifier 43. The inverting amplifier 43 amplifies the comparison result 23 and outputs a chopper boosting command C1 to a comparator 44 which compares the command C1 with a reference triangular wave outputted from a triangular wave generation circuit 45. Accordingly, the inverter voltage control circuit is able to control the voltage P and N of the main circuit S under the desired value, i.e., reference voltage value REF 2 during generation of the flywheel R.

The first comparator 18 of a revolution control circuit of the flywheel device, shown in FIG. 5, compares the speed detection value 20 with reference speed value REF 1. The comparator 18 amplifies the comparison result 22 which operates the flywheel device R as a driving current reference value by current setting volume. Operation amplifiers 46 and 47 amplify the detected value of the current transformer 32 and the comparison result 22, respectively. An operation amplifier 48 amplifies the output value of the operation amplifiers 46 and 47, and outputs a chopper falling command C2 to a comparator 49 which compares the command C2 with the reference triangular wave outputted from the triangular wave generation circuit 45. The triangular wave generation circuit 45 provides a reference triangular wave having a constant period and a constant amplitude.

Operation of the flywheel power source apparatus will be described. At normal state, the DC output voltage V1 of the converter 4 is converted into the voltage V2 by the falling chopper composed of the second chopper circuit CH2 and the reactor 31, and the voltage V2 is supplied to the flywheel device R through the inverter 17; thereby the flywheel device R is driven as motor. At this moment, the voltage V1 is normally established higher than the voltage V2.

The speed detection value 20 of the flywheel device R and the speed reference value REF 1 are compared in the first comparator 18, and the output current of the chopper 16 is controlled based on the comparison result 22. The output of the chopper 16 is smoothed by the capacitor C.

Operation of the flywheel device in the accelerating state, namely operation as a motor will be described. The value of the voltage V2 is controlled and the flywheel device R is driven by the inverter for controlling the predetermined value of the current according to the transistor CT2, the diode CD2 of the second chopper circuit CH2 and the reactor 31 at accelerating state. When the revolving speed of the flywheel device R approximates the speed by the reference value REF 1, the output current of the chopper 16 is controlled to be decreased in order to prevent boosting the revolving speed over the setting value. As the result, the revolving speed of the flywheel device R is maintained at the constant speed.

During outage, the flywheel device R is operated as generator according to the stored energy due to rotational driving, and the voltage V2 generated through the inverter 17 is converted into the voltage V1 by the boosting chopper and then supplied to the front stage of the inverter 5 of the main circuit S. The boosting chopper is composed of the transistor CT1, the diode CD1 of the first chopper circuit CH1 and the reactor 31, and the chopper 16 is controlled to output the setting voltage (V1) according to the reference value REF 2.

The voltage V1, i.e., the voltage output value 21 of the inverter 17 is compared with the voltage reference value REF 2 in the second comparator 19, and the chopper 16 is controlled based on the comparison result 23 and the voltage V1 is held constant.

According to the invention as above described, the chopper circuit controlling voltage only and the inverter circuit controlling frequency only in series connection are installed in the voltage compensation circuit including the flywheel device; thereby the inverter control can be simplified.

Since the chopper circuit need not be installed in the main circuit, the rating burden of the main circuit is reduced.

Further, as the chopper circuit of the main circuit is obviated, the DC filter also may be omitted, thereby the circuit constitution is simplified and the cost is decreased.

What is claimed is:

1. A flywheel power source apparatus comprising a main circuit having a converter for converting AC (alternating current) power source output into DC (direct current) output and a first inverter for converting the DC output of the converter into AC output and supplying it to a load, a flywheel device supplied with power from the main circuit and driven for rotation, and a compensation circuit for supplying the stored energy based on the rotational energy of the flywheel device to the first inverter of the main circuit, wherein said compensation circuit is composed of
a chopper circuit for controlling the voltage of the power supplied from the converter to the flywheel device in the normal state and of the power supplied from the flywheel device to the first inverter during service interruption;
a second inverter for controlling the frequency of the power supplied in the normal state and the power supplied during service interruption;
a first comparator for controlling the chopper circuit based on the output of the flywheel device during service interruption; and
a second comparator for controlling the chopper circuit based on output of the converter in the normal state.

2. A flywheel power source apparatus as set forth in claim 1, wherein said compensation circuit is composed of the flywheel device, and the chopper circuit and the second inverter connected in series to a joint between the converter and the first inverter.

3. A flywheel power source apparatus as set forth in claim 1, wherein said first comparator is connected between the chopper circuit and the flywheel device in parallel relation to the second inverter.

4. A flywheel power source apparatus as set forth in claim 2, wherein said second comparator is connected between the chopper circuit and said joint in parallel relation to the compensation circuit.

5. A flywheel power source apparatus as set forth in claim 1, wherein said chopper circuit is controlled based on comparison results of the first comparator for comparing the rotational speed reference value of the flywheel device with the speed detection value of the flywheel device and the second comparator for comparing the voltage reference value of the DC output of the converter with the power output value of the chopper circuit respectively.

6. A flywheel power source as set forth in claim 1, and further including a smoothing capacitor for smoothing an output of said chopper circuit, said capacitor having one end connected to a node which connects the compensation circuit and the first inverter of the main circuit and having the other end connected to ground.

* * * * *